UNITED STATES PATENT OFFICE.

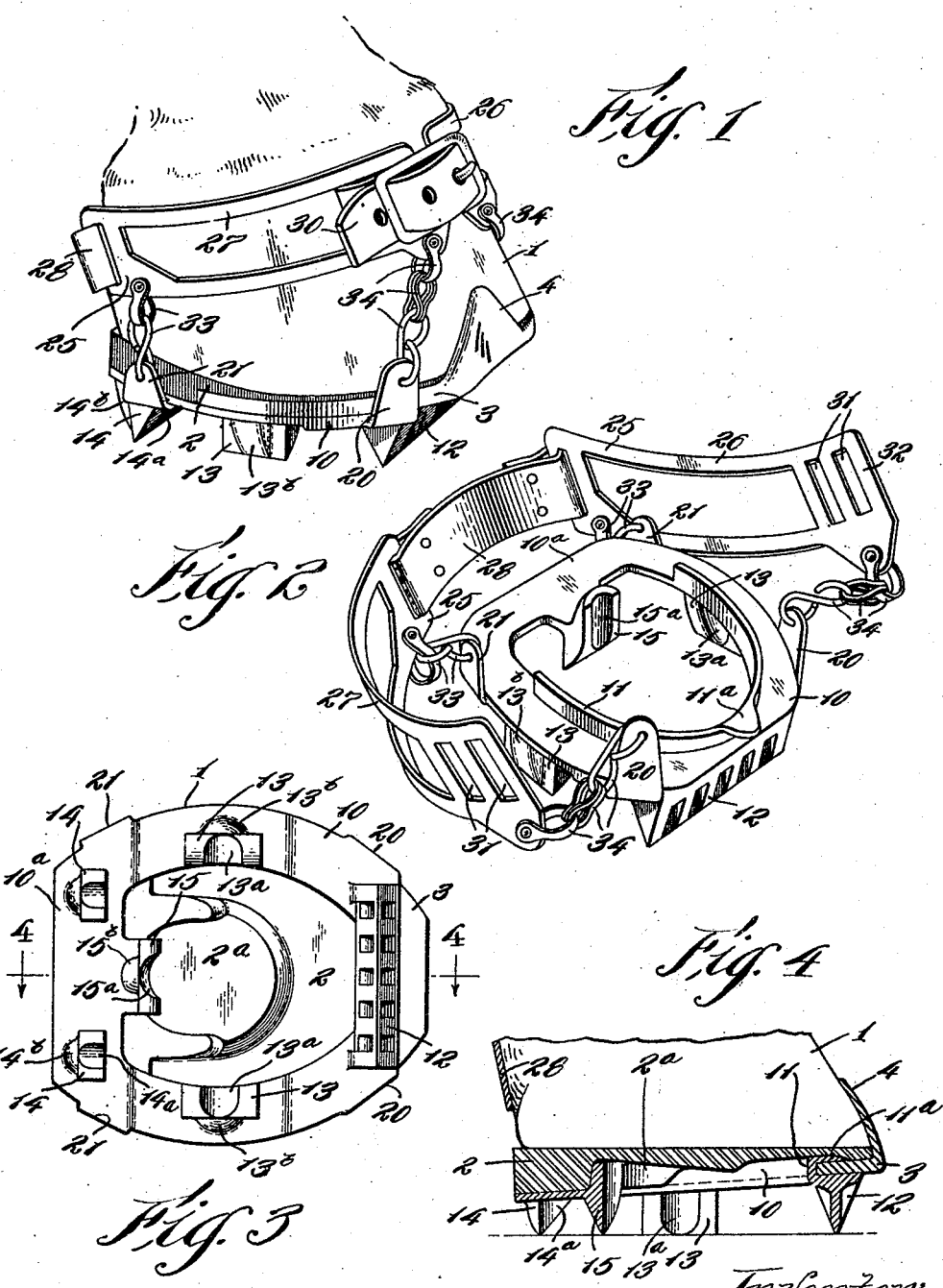

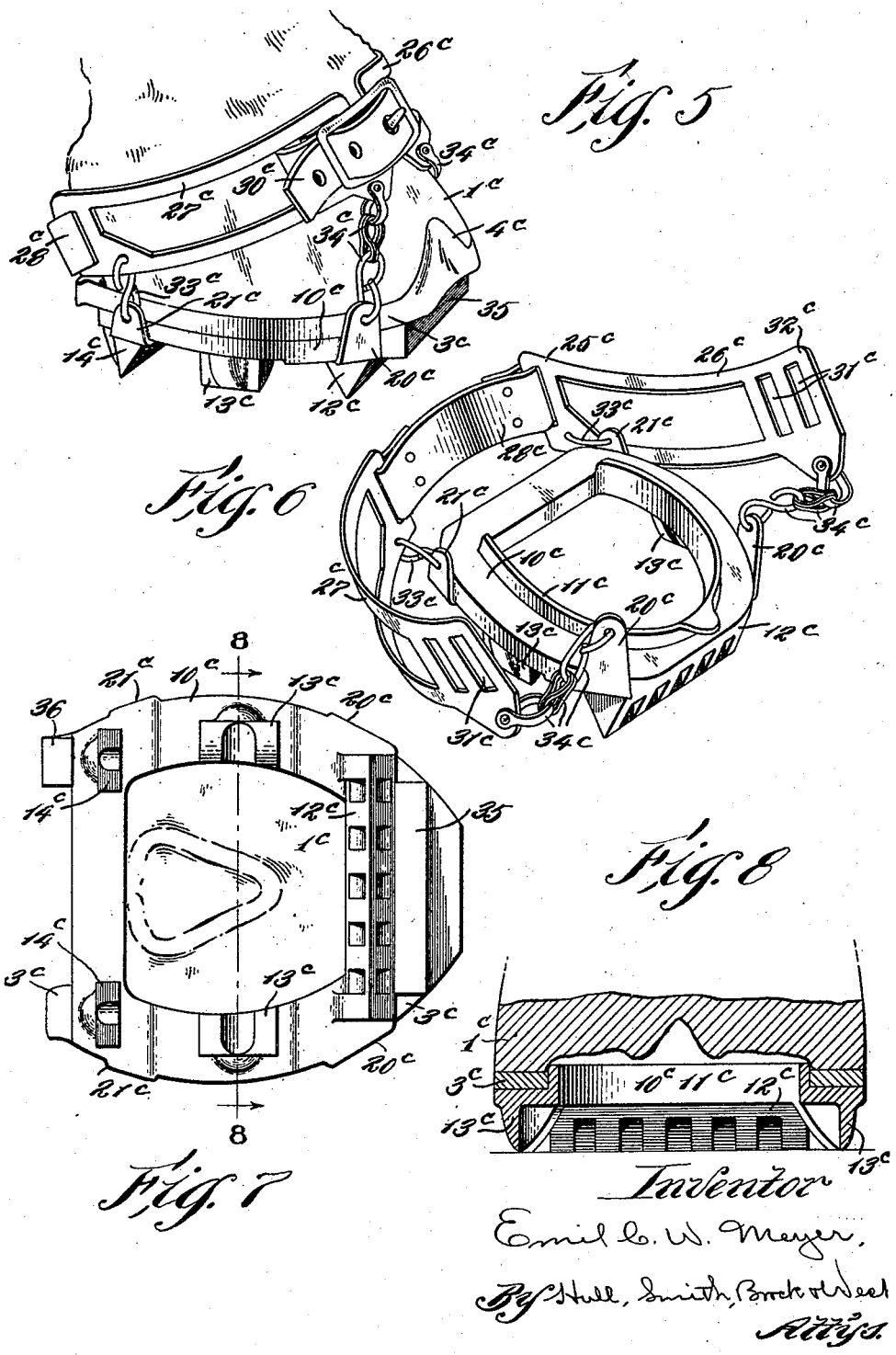

EMIL C. W. MEYER, OF CLEVELAND, OHIO.

NONSKID DEVICE FOR HORSESHOES.

1,420,331.  Specification of Letters Patent.  Patented June 20, 1922.

Application filed April 25, 1919, Serial No. 292,544. Renewed November 19, 1921. Serial No. 516,511.

*To all whom it may concern:*

Be it known that I, EMIL C. W. MEYER, a citizen of the United States, residing at Cleveland, in the county of Cuyahoga and State of Ohio, have invented a certain new and useful Improvement in Nonskid Devices for Horseshoes, of which the following is a full, clear, and exact description, reference being had to the accompanying drawings.

This invention relates to an attachment for horseshoes for preventing horses from slipping on ice or on slippery roads and pavements, and it has to do also with an improved calk that is adapted for use with horseshoes generally although it is peculiarly suitable for use with the present attachment.

I am aware of the fact that several devices known as "overshoes for horses" have been brought out with the same general objects in view as those attained through my attachment, but among those with which I am familiar there is none that is satisfactory, principally because it shifts with respect to the hoof or shoe especially when subjected to strain, and usually it is more or less difficult of attachment, is cumbersome, inefficient, and comparatively short-lived.

The objects of my invention are, to provide an attachment that may be quickly and conveniently applied to a horse's hoof and as readily removed therefrom; that interlocks with the shoe in such a way as to be firmly held against displacement in any direction; that is comfortable and easy on the horse's hoof; that involves trappings for attaching it to the hoof, which trappings fit the hoof snugly and neatly and are therefore not likely to catch on adjacent objects, at the same time rendering the device attractive in appearance; the provision of a device of the aforesaid character that is durable, and that may be easily adjusted to accurately fit various sizes of hoofs within a reasonable range.

Another object of the invention is to provide an always-sharp calk, so designed as to possess a comparatively thin cutting lip or edge practically throughout the life of the calk.

The foregoing objects and others which will become apparent as this description proceeds are attained in the embodiments of my invention illustrated in the accompanying drawings which form a part hereof, and wherein Figure 1 is a perspective view of a horse's hoof having my non-skid attachment applied thereto; Fig. 2 is a similar view of the attachment removed from the hoof; Fig. 3 is a bottom plan view of the hoof with the attachment applied; while Fig. 4 is a section on the line 4—4 of Fig. 3; Figs. 5, 6, and 7 are views similar to Figs. 1, 2 and 3, respectively, of another form of the invention; and Fig. 8 is a section on the line 8—8 of Fig. 7.

The form shown in Figs. 1 to 4 is designed for use especially on mounts or saddle horses, as, for instance, on horses of mounted policemen, military officers, etc.; and the form illustrated in the succeeding figures is for use particularly on draft horses. I shall proceed to describe the two forms of the invention in the order named.

The hoof 1, in Figs. 1, 3 and 4, is fitted with a form of shoe that is used extensively for the horses of mounted policemen, the same involving a rubber pad 2 that covers the bottom of the hoof and extends entirely to the rear thereof, and a metal protector 3 which extends about the forward edge portion of the pad and has a toe-piece 4 that extends up over the front of the hoof. The pad 2 corresponds in shape quite closely to that of the bottom of a hoof and includes what may be regarded as an artificial frog $2^a$. The composite shoe constituting the rubber and metal parts just described is attached to the hoof in the customary manner.

The form of my attachment illustrated in Figs. 1 to 4 consists of a member 10 that is generally U-shaped and closed at what may be regarded the top of the U as indicated at $10^a$, said member consisting preferably of a forging of such style as to fit flat against the horseshoe. A flange 11 projects upwardly from the side and front inner edge portions of the member 10 and is designed to accurately fit the inside of the horseshoe, and a nib 11$^a$ projects forwardly from the upper edge of the front portion of the flange in a position to be engaged over the toe portion of the shoe when the flange 11 is inserted into the confines of the shoe. Thus the member 10 will be held against shifting in any direction in the plane of itself, and the front end portion will be further prevented from withdrawal in a direction at right angles to the plane of the shoe by the nib 11$^a$. The member 10 is held firmly against the bottom of the shoe by trappings which I shall later describe.

Calks 12, 13, 14, and 15 project from the bottom of the member 10. These calks may be attached to the member in any suitable manner, or they may be formed integral therewith. The calk 15, it will be observed from Figs. 2 and 4, extends upwardly above the plane of the member 10 in such a position as to engage within the depression of the artificial frog 2$^a$ of the pad 2 so as to contribute to the holding of the attachment against lateral displacement.

Attention is directed particularly to the form of calks employed with my attachment, as I regard this an important feature of my invention. It will be observed that the front and rear inclined surfaces of calk 12 are provided with series of niches or depressions which reduce the horizontal cross-sectional area of the calk between the opposed niches to a very slight dimension so that regardless of how far down the calk wears, it possesses a comparatively sharp or narrow biting edge or lip so long as it is not worn down beyond the extent of the niches. The calks 13, 14 and 15 possess the same feature, although of a slightly different style. These calks have niches 13$^a$, 14$^a$, and 15$^a$, while their opposite wall is extended outwardly as indicated at 13$^b$, etc., to provide the necessary quantity of metal.

20 and 21 are anchorage lugs that are so positioned as to snugly embrace the front and rear portions respectively of the shoe or horse's hoof. They are shown as formed integral with member 10.

The trappings hereinbefore referred to for holding the attachment to the hoof comprises a girdle 25 that is made up of the skeleton plates 26 and 27 that are connected at their rear ends by a strip 28 of flexible material such as leather. The girdle is made to snugly fit the upper portion of the hoof, and the strip 28, being made of comparatively soft pliable material, does not injure or irritate the soft part of the foot. I prefer to connect the forward ends of the skeleton plates 26 and 27 by means of a strap and buckle, although I do not restrict myself to this method of attachment. The strap 30 is adapted to be interlaced through the slots 31 so that the buckle will overlie the end of the skeleton plate 27 in a position to receive the free end of the strap after the same has been passed from the rear side of plate 27 to the rear of the front portion of plate 26 and engaged about the bar 32 thereof and folded back for insertion through the buckle. The rear ends of the plates 26 and 27 have connection through links 33 with the perforated ends of the anchorage lugs 21; and the forward ends of the plates are similarly connected to the anchorage lugs 20 by means of the links 34.

The style of attachment illustrated in Figs. 5 to 8 is quite similar to that previously described, the essential differences being that the entire structure is made somewhat heavier to withstand the harder service incident to the work of draft horses. The flange which is designed to fit within the shoe is extended farther to the rear so as to provide a firmer hold; and the rear central calk 15, with its extension for engagement with the frog of the hoof, is dispensed with, hence the rearward continuation of the aforesaid flange to compensate for its absence.

Because of the similarity between the two forms of the invention, I have applied the same reference characters to the corresponding parts of both, and in order to avoid confusion in the reading of the specification I have added the exponent $c$ to the reference characters of the later form.

The shoe of the draft horse differs from that of the mount in that it is equipped with a toe calk 35, and one heel calk 36, in accordance with the usual practice, the shoe itself being designated 3$^c$. The attachment is designed to fit accurately between the toe calk and heel calk, with the upturned ends of the anchorage lugs 20$^c$ and 21$^c$ firmly embracing the sides of the shoe 3$^c$.

It will be seen that, with an attachment designed in accordance with my invention to so accurately fit a shoe as to withstand considerable lateral strains without displacement and be held against withdrawal by the girdle and connections which I have herein disclosed, there will be no danger of the attachment becoming loose in service although the same may be very quickly and conveniently removed from the hoof when desired and applied thereto in an equally facile manner.

Having thus described my invention, what I claim is:

An attachment for shoes comprising a continuous member for engagement with the wearing surface of the shoe, an upstanding flange formed along the inner edge of said member, a nib projecting forwardly from said flange and adapted to engage the shoe, calks formed on the under surface of said continuous member, one of said calks being located on the transverse rear portion of said continuous member, said last-mentioned calk being projected above the plane of said continuous member and adapted to engage the shoe, a girdle adapted to surround the hoof, said girdle comprising side plates flexibly connected at the front and rear, and link connections between said girdle and said continuous member.

In testimony whereof, I hereunto affix my signature.

EMIL C. W. MEYER.